United States Patent [19]
Vöhringer et al.

[11] Patent Number: 4,770,118
[45] Date of Patent: Sep. 13, 1988

[54] COATING BOOTH FOR APPLYING A COATING POWDER TO THE SURFACE OF WORKPIECES

[75] Inventors: Gerhard F. Vöhringer; Armin Reiser, both of Friedrichshafen, Fed. Rep. of Germany

[73] Assignee: Esb Elektrostatische Spruh- und Beschichtungsanlagen G. F. Vohringer GmbH, Meersburg, Fed. Rep. of Germany

[21] Appl. No.: 920,985

[22] PCT Filed: Dec. 23, 1986

[86] PCT No.: PCT/DE85/00558

§ 371 Date: Sep. 2, 1986

§ 102(e) Date: Sep. 2, 1986

[87] PCT Pub. No.: WO86/03994

PCT Pub. Date: Jul. 17, 1986

[30] Foreign Application Priority Data

Jan. 2, 1985 [DE] Fed. Rep. of Germany ....... 3500005

[51] Int. Cl.[4] .............................................. B05B 15/12
[52] U.S. Cl. ............................ 118/312; 118/DIG. 7; 118/326; 55/DIG. 46; 98/115.2
[58] Field of Search ......... 55/302, 304, 350, DIG. 46; 118/326, 634, DIG. 7, 312; 98/115.2

[56] References Cited

U.S. PATENT DOCUMENTS

| 3,905,785 | 9/1975 | Fabre | 98/115.2 |
| 4,153,008 | 5/1979 | Marino et al. | 118/634 |
| 4,223,599 | 9/1980 | Napadow | 118/326 X |
| 4,227,903 | 10/1980 | Gustavsson et al. | 55/302 |
| 4,401,445 | 8/1983 | Browning | 98/115.2 |
| 4,506,625 | 3/1985 | Vohringer | 55/302 |

FOREIGN PATENT DOCUMENTS

| 100932 | 2/1984 | European Pat. Off. |
| 2936424 | 3/1981 | Fed. Rep. of Germany |
| 3140454 | 4/1983 | Fed. Rep. of Germany |
| 3318043 | 11/1984 | Fed. Rep. of Germany |
| 2035834 | 6/1980 | United Kingdom |

OTHER PUBLICATIONS

Metalloberflache, 39 (1984), 4 Apr. 1984, Prof. Dr. W. Jantsch and Dr. J. Hofmann, pp. 129–133.
ESB Elekstrostatische Spruhund Veschichtungsanlagen G.F. Vorhinger GmbH, Kompakte Pulver-Beschichtungsanlage nutzt besseres Funtions-prinzip für Vielfarbenbetieb mit und ohne Recycling.
Gema Ag., Das neue GEMA-Pulverruckgewinnungssytem MFG für Automatikenlagen ermöglicht wirtschaftlichen Farbwechsel, pp. 1–8.
GEMA AG, TFR-Trommel-Filter Rückgewinnung: das richtungsweisende Baukasten-System den kleineren bis mittleren Produktionsbereich. pp. 1–4.
GEMA AG, Pulver-Rückgewinnung Typ BHS.
Deutsches Patentant Anlage 2, Patent an meldung P3500005.8.
WO82/02680, 8/1982.

*Primary Examiner*—Shrive P. Beck
*Attorney, Agent, or Firm*—Herbert Dubno

[57] ABSTRACT

A booth for applying a powdered coating to the surface of workpieces in which a clean gas zone (47) is joined to the coating zone (18) via the rear wall (14), which is connected to an extractor fan. Located in a recess (21) of the rear wall (14) is a frame-like structure (22), the outer frame (17) of which is split up into individual areas (24) by means of frame cross-members (23), each area receiving a filter element (25), which is housed in an interchangeable cassette, and consisting of a continuous zig-zig shaped or wave-shaped surface-membrane filter strip. Each area of the frame is covered in a leak-proof manner by a protective hood (69) in whose hood space (25) in an oblique manner towards the coating zone (18) and detach the excess powder attached to the membrane applied thereon, which is diverted through a slat-type screen (55) down to the floor of the booth (67) and into a powder container (80). Thorough cleaning can be effected by a second cleaning device arranged in the coating zone or after removal of an interchangable cassette from the booth.

8 Claims, 6 Drawing Sheets

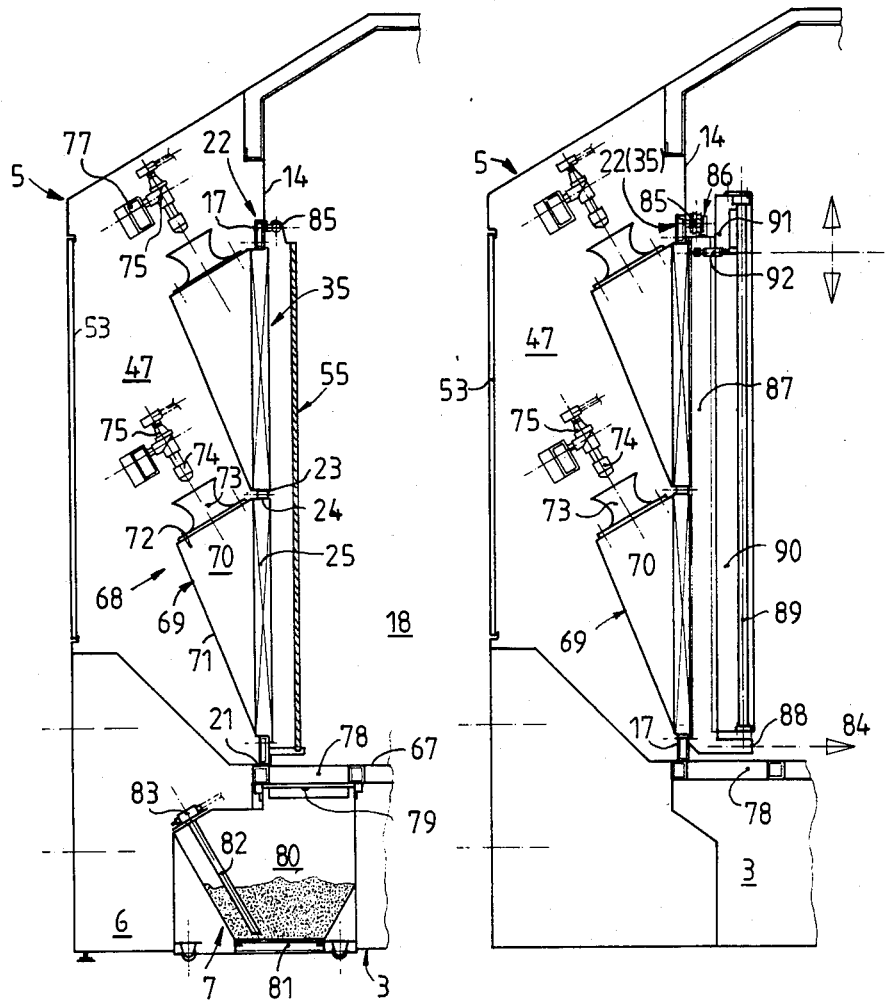

COATING BOOTH FOR APPLYING A COATING POWDER TO THE SURFACE OF WORKPIECES

CROSS REFERENCE TO RELATED APPLICATIONS

This application is a national phase application of PCT/DE85/00558 filed Dec. 23, 1985 and based, in turn upon a German national application P 35 00 05.8 filed Jan. 2, 1985 under the International Convention.

FIELD OF THE INVENTION

The present invention relates to a coating booth for applying a coating powder to a surface of a workpiece, the powder being directed via an air stream on to the workpiece in the coating zone of the booth, the booth being also equipped with a suction device for exhausting the booth air through a filter assembly, with several filter elements in the form of surface filters, towards a clean-gas zone, located behind the filters with respect to the air stream and having a cleaning device for the cleaning of the filter elements at intervals, during the powder spraying process.

BACKGROUND OF THE INVENTION

The term "surface filter" means here a plane surface filter with reduced thickness, or with a limited effective filter depth, independent of the manner the filtering material is arranged. The individual effective filter surfaces have then a relatively small distance to the boundary of a filter assembly or a filter body, or element. In principle, filter plates could be used. However, as a rule the filter is formed by filter strips, made of paper, synthetic material or other such thin filter material, which can be arranged in a zig-zag manner or wave-like manner, in order to increase the effective filter surface obstructing access for cleaning purposes.

For instance, two filter plates are arranged slantedly over an inner upper edge of the coating zone, according to U.S. Pat. No. 4,303,417, wherein the remaining space, defined by this division, becomes the clean gas zone, from which the filtered air is exhausted. However, in this case the available filter surface is just as limited as the qualitative and quantitative filter efficiency and the replacement of the high-positioned plate-like filter elements is difficult. When the color is changed, and also in the case of each powder change, the filter plate has to be taken out and cleaned outside the booth.

A self-acting cleaning device for filter elements is also shown in German published specification No. 25 50 918, wherein a horizontally slidable filter carriage is used for the cleaning of vertically arranged and mutually parallel filter pockets which are subjected to periodic pulses of compressed air.

Another self-acting cleaning device is shown in the German published specification No. 14 07 293, according to which horizontally arranged blow pipes with several nozzle openings are slidable along the surface of screens or fan filters arranged in a V for dust collector devices. Neither device is suitable for powder recovery devices in spray booths.

Further, a coating booth is known from German published specification No. 19 51 361, wherein a clean gas zone is separated from its back wall by a vertically arranged filter, folded in a zig-zag pattern. In this case the filter folding of the thin filter material is so coarse, that the total thickness amounts to more than 15% of the entire booth depth. As a result, the filter can be only roughly cleaned and has to be dismounted at each color change. In addition it is very unstable and can be exposed only to reduce pressure loads.

An even more coarsely folded zig-zag filter, whose thickness amounts to about half of the booth depth and which is mounted on a removable carriage on the near side of the booth, is shown in U.S. Pat. No. 4,401,445. For the cleaning, the filter carriage has to be removed entirely from the booth. In this case, the cleaning operation is also cumbersome and mostly incomplete.

OBJECT OF THE INVENTION

The invention has as its object to provide an improved filter assembly in a space-saving manner, with the filter elements so that, on the one hand, they can be easily handled, mounted and dismounted, and, on the other hand, they can be subjected to a thorough cleaning, even to their pores, in their booth supports, in order to increase the available operation time of the entire booth, even during color-changing processes, without increasing the time for filter changes.

SUMMARY OF THE INVENTION

To solve this problem, the filter elements are replaceably located in individual frame units of a rigidly shaped frame work, which is mounted in a recess of a lateral wall positioned approximately vertically between the coating zone and the clean gas zone, having in front of it, on the booth bottom in the coating zone, a removal device for the removal and direction of the excess powder to a powder container.

The surface filters themselves take here practically no additional space, do not obstruct such space and their size and resistance can be selected at will, which permits an increasing of the stream load, and, as a result, of the filter efficiency. Due to the arrangement in individual units of the framework, the handling is facilitated, so that according to necessity, the individual filter elements can be exchanged or removed at intervals, for a particularly thorough in-depth cleaning. Basically, however, the cleaning in the frame units can be arranged either during the operation or during work stoppage, so that the switch to another powder material, particularly other color shades, can proceed without dismounting the filters. Thereby, the setting period during color changes is reduced, as well as the total amount of investment costs.

The large-surface construction of the filter assembly in a side wall, particularly in the rear wall of the coating zone, leads to a uniformization and stabilization of the stream of powder carried by the carrier gas in the booth. As a result, the powder concentration in the booth atmosphere is then more uniform as is the power density deposited on the surface of the workpiece. Since the removal device on the bottom of the booth also does not occupy considerable room, a particularly economical construction results, which is influenced only by a certain depth of the clean gas zone to be provided behind the rear wall.

The handling of the filter elements, as well as of the entire filter assembly, is also improved and the filter efficiency is increased, insofar as each filter element is contained in a replaceable in module. This way, the filter element is protected against exterior damage and also against overload due to high pressure differences. Whenever it is the case, it can be inserted from the coating zone, transversally to its plane, into a unit of the framework, and tensioned within the framework by locking devices. This way, the effective filter surface can be extraordinarily increased, due to a zig-zag-pattern or wave-shaped folding of the filter strip, without the danger of overload.

Such an increase is achieved according to the invention also due to the fact that filter elements with surface-membrane filters are used, which have an air-permeable stiffening support layer and a surface membrane made of flexible, elastically moldable synthetic material, wherein a multitude of elongated perforations are provide, affixed to at least one side of the support. It has proven to be suitable to stretch the surface membrane at least unidimensionally for the formation of thin, elongated filaments between slit-like perforations.

The surface-filter material used here has the particular advantage that, on the one hand the clear width of especially the slit-like membrane perforations are usually small, and on the other hand, the porportion of perforations in the entire membrane surface is extraordinarily large. Since, in addition, the membrane itself is correspondingly thin, which also permits a thin support layer, the resulting thickness of the surface-filter strip is considerably smaller than in the known filter materials. This is particularly advantageous for the folding in the inserted filter modules, since correspondingly increased effective filter surfaces can be encased in the available volume of the module.

Finally, another advantage of the surface-membrane filter is that the surface facing the coating zone is very smooth and also insensitive to mechanical stress. This results primarily in the fact that larger powder grains are rejected almost without exception and fall down along the vertical surface, while smaller powder particles are exposed to relatively reduced adhering and holding forces. This again facilitates the cleaning and improves the effect of the pulse cleaning system, known per se from the previously mentioned U.S. Pat. No. 4,303,417 for filter plates. In comparison thereto, the membrane filters have a novel contribution, due to the fact that the surface membrane is exposed to the postvibrations of the release pulse, which brings with it additional release effects. Primarily due to the reduced adhesion forces and the improved release capacity of the powder particles it is possible in principle to switch even to contrasting colors during color change, with to the now used pulse-cleaning.

Although the surface membrane is relatively resistant to wear due to the impact of the powder particles, the wear can not be totally precluded after a longer use, just as much as the modification of the surface structure due to roughening can not be avoided. In order to counteract these effects, high-quality synthetic materials, such as polytetrafluorethylene (PTFE) are used. On the other hand, the adhesion effect for small powder particles can increase with time. In order to increase the life of the individual filter elements, in spite of such wear phenomena, a second cleaning device is the basic cleanser of the filter elements, which is mounted in the coating zone, in front of the rear wall containing the filter assembly.

In accordance with the invention, for this second cleaning device a back-and-forth sliding carriage is preferably used, sliding along the plane of the filter assembly, this cleaning carriage having a guide way for a vertically up-and-down movable slider with a cleaning nozzle, whose range of movement is covered by a guide shell, which favors the removal of the powder loosened from the filter, just as much as the hood mounted in front of the filter assembly, and, in certain cases, the specially provided suction device.

For many uses, a basic cleaning by the second cleaning device in the booth is sufficient. This basic cleaning however, requires a certain amount of time, during which no workpieces can be coated. Because of that, many times it is suitable to change the filters by means of the quick-exchange modules and to subject the removed modules to an intensive cleaning outside the filter booth.

The use of surface-membrane filters in exchangeable modules has the additional advantage that the membrane which does not have a very rigid shape can be additionally supported within the modules, in order to withstand the high impact pressure of approx. 4 to 7 bar.

BRIEF DESCRIPTION OF THE DRAWINGS

Further features and advantages of the invention are explained in greater detail below with reference to the drawing, in which:

FIG. 10 is a partial section along line IX—IX in FIG. 4;

FIG. 11 is a further partial section along line X—X in FIG. 4 with a basic cleaning device;

SPECIFIC DESCRIPTION

Figure 1:
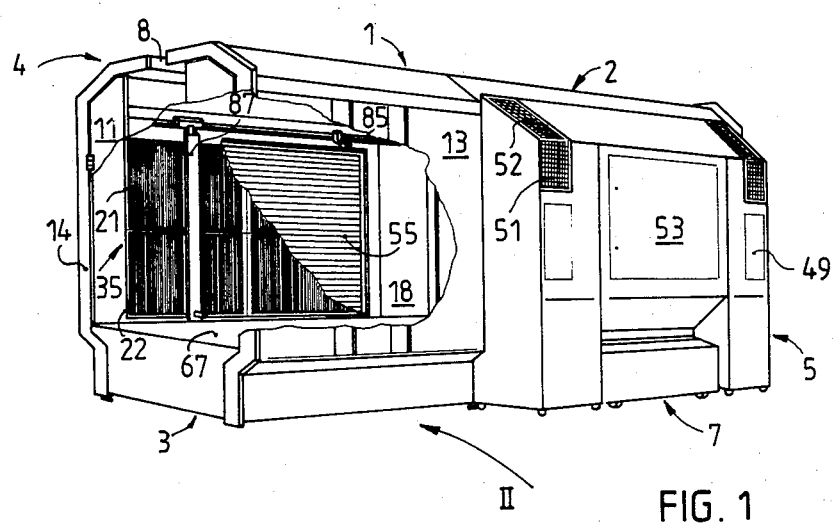
FIG. 1 is a perspective view of two double booths, built in accordance with the invention.
Figure 2:
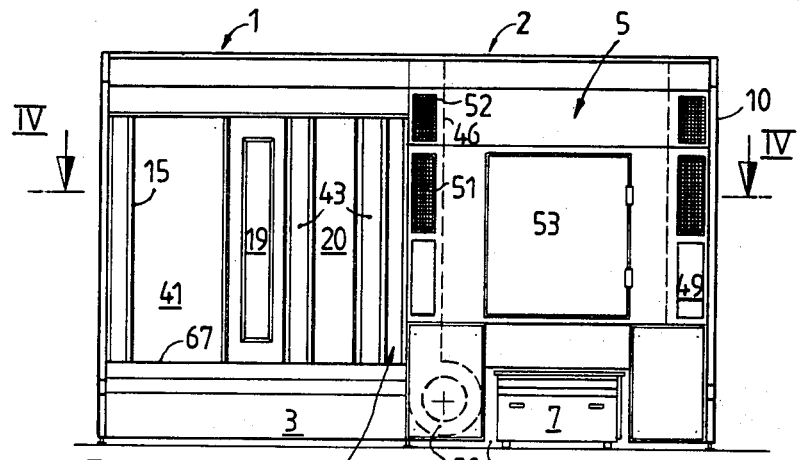
FIG. 2 is a front elevation of booths seen in a frontal view taken in the direction of the arrow II in FIG. 1.
Figure 4:
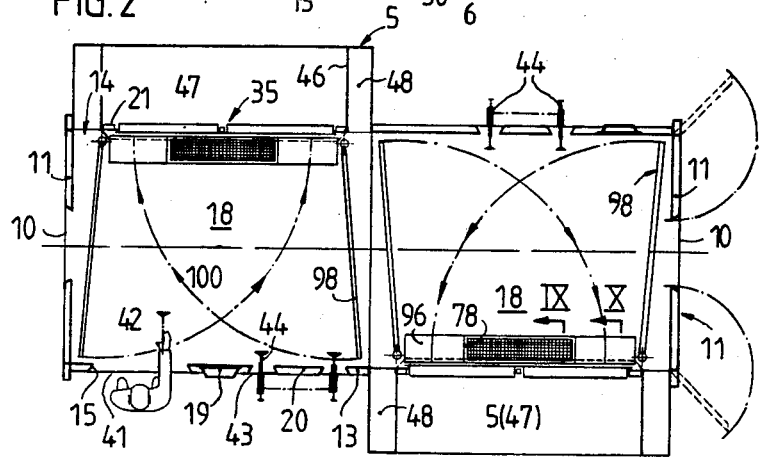
FIG. 4 is a section along line IV—IV of FIG. 2.
Figure 3:
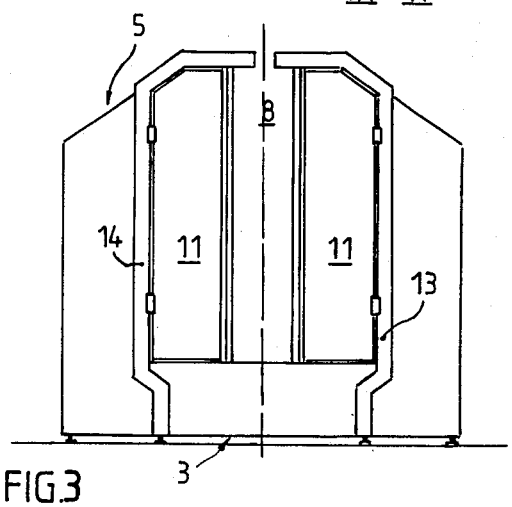
FIG. 3 is a front view of the booths seen from the left in FIG. 2.
Figure 5:
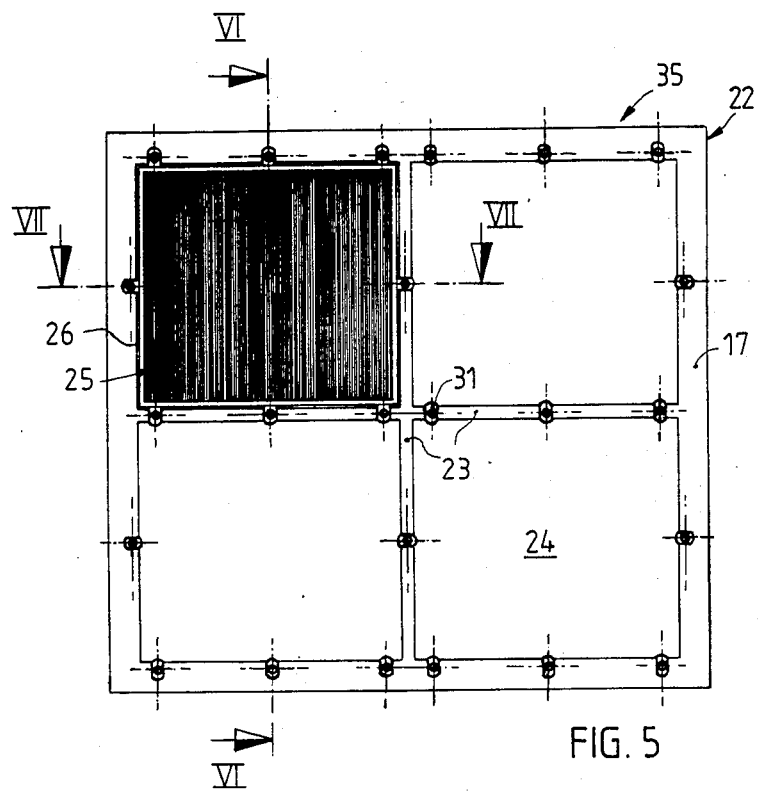
FIG. 5 a frontal view of a filter assembly provided for four filter elements.

The FIG. 1 to 4 show two booth units 1,2 joined to each other in longitudinal direction; each having a base portion 3, a tunnel-shaped structure 4, a blower mounting 5 and a powder container 7 located in a recess 6 of the base portion 3. The tunnel structure 4 can be closed at its frontal ends 10 either completely or partially on both sides of a passage 8 by swinging doors 11.

Each booth unit 1, 2 has a front wall 13 and a rear wall 14 which define the coating zone 18 with the ends 10. A frontal opening 15 provided in the front wall 13 is subdivided by individually displaceable wall segments 19, 20 into a wider injection slit 41 for a manually guided spray gun 42 and two narrow injection slits 43 for automatic spray guns 44 FIG. 4.

To the outside of the rear wall 14 the blower mounting 5 is connected and it is subdivided by dividers 46 into a center clean gas zone 47 and two lateral blower chambers 48. Each of these blower chambers 48 is accessible from the outside through a door 49 and houses at least one exhaust fan 50 whose intake side is connected with the clean gas chamber 47 and pressure-wise with the environmental air through a grating 51, 52. The clean gas zone 47 itself is accessible from the outside through a further swinging door 53.

In the rear wall 14 of at least one booth, a filter recess 21 extending over the greater part of the rear wall is provided. This filter recess contains a plate-shaped filter assembly 35 with four filter elements 25 each of which is located in a rectangular unit 24 of a framework 22 defined by the outer frame 17 and frame crossmembers 23.

Each of these filter elements 25 is fitted into a frame which is a replaceable module 26 sealingly supported at the outer frame 17 and the cross members 23 by means of locking devices 27 and a marginal seal 28. With a frame angle 29, each module encompasses a wave-shaped filter strip 30 and holds its margins sealingly and reliably with a layer 34 of a grouting made of a hardenable synthetic material.

Each locking device 27 at the outer frame 17 and one of the frame cross members 23 has a swivel latch 31 which engages in a receiving recess 33 of the replaceable module 26, under the influence of a compression such as generated by the elastically deformable marginal seal 28, with at least one of both its two latch catches 32. Its individual filter elements 25 can be this way conveniently inserted and replaced.

Figure 8:
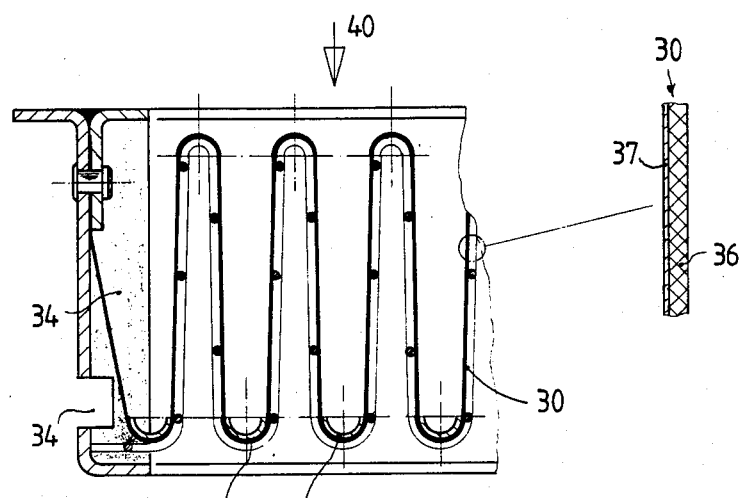
FIG. 8 is a detail view of a segment of FIG. 7 drawn to scale.
Figure 9:
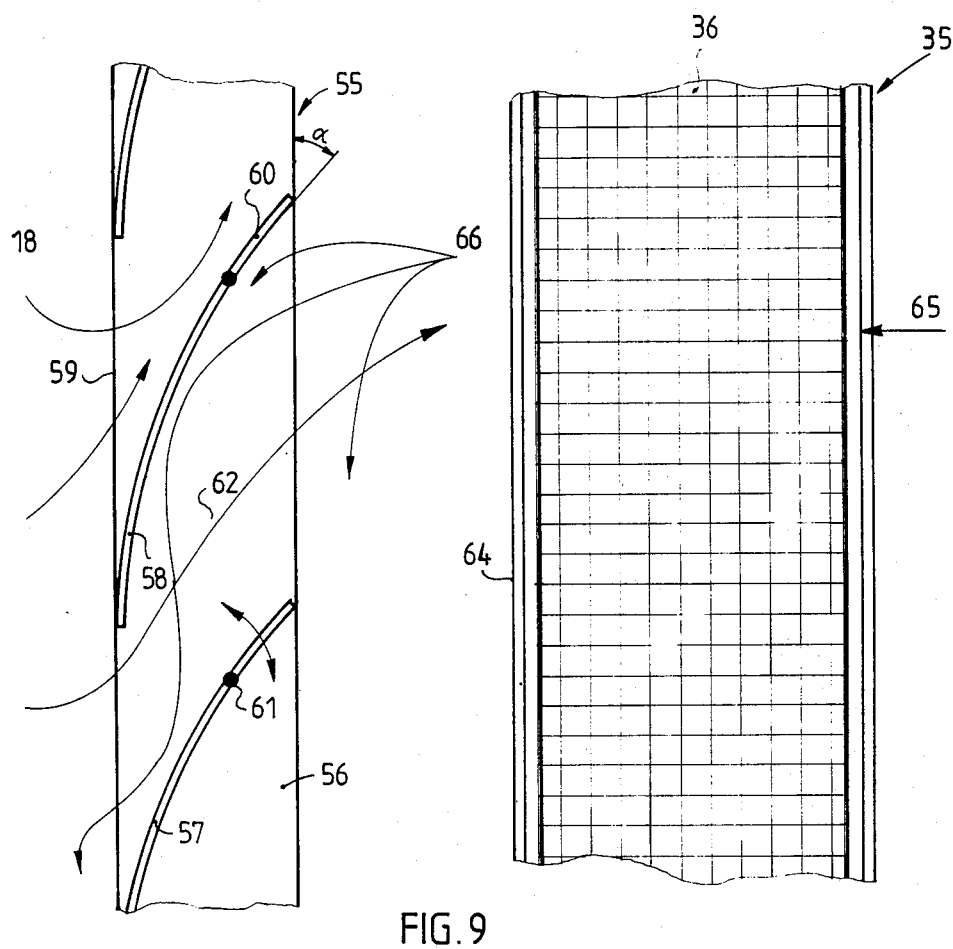
FIG. 9 is a partial section through the filter assembly and a hood mounted in front thereof.

The filter strip 30 inserted herein has, according to FIG. 8, a thicker support layer 36 made of sintered plastic material, felt, blotter, paper or the like, and to one side thereof oriented towards the crude gas zone or the coating zone 18, a thin surface membrane 37 made of elastically deformable synthetic material. This surface membrane is provided with numerous elongated perforations, which together amount to a relatively big surface fraction of the filter strip 30, but are so narrow that they are capable of stopping even very fine dust particles.

The support layer 36 has to have at least the same degree of gas permeability as the surface membrane 37; as rule it is many times higher, since its function is basically limited to supporting the surface membrane. The surface membrane 37 as a rule, is made of a foil of synthetic material, provided first with fine, approximately circular perforations and then stretched in one or several, mutually inclined, directions, so that the initial perforations are stretched lengthwise and become slit-shaped. The membrane can be after that affixed to the support layer 36. In principle, it is also possible to perform the stretching and perforating on or with the support layer.

Both layers can be made out of the same basic material although, as a rule, the support layer can be made of a material of lesser quality. Both layers have to be capable of withstanding external influences, such as occur during the powder coating, due to the use of various materials. But, first of all, it is important to select the proper material for the surface membrane 37, whereby, in addition to the resistance of the material, its strength and ability to stretch have to be taken into consideration. In order to enable it to stretch into numerous, very fine, fibers. This way, a high degree of air permeability is achieved with relatively small width of the clear openings. Polytetrafluorethylene PTFE has proven to be a preferred material for the surface membrane 37.

Figure 7:
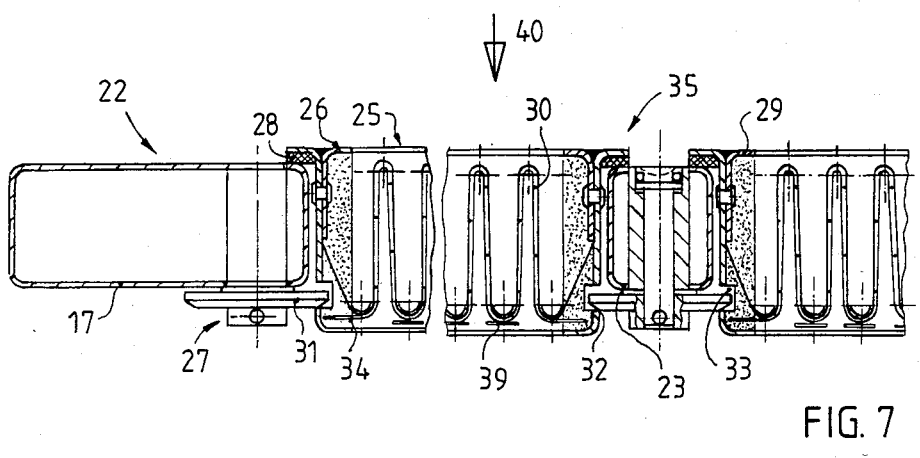

The wave-shaped folded filter strip 30 is expoded to the oncoming flow in the direction of the arrow 40 in FIG. 7. It should be stiffened and reinforced additionally within the replacement module 26 so that no air-permeable parts are pressed immediately against the walls of the module.

For this purpose, the curved segments of the wave-like strip, shown at the bottom in FIG. 7, are stiffened by cup-like reinforcements. In addition thereto, between the filter strip and the inner wall of the replaceable module 26 a screen-like support grating 39 made of wire gauze or the like is inserted. The support grating should offer as little resistance to the flow as possible and yet be stiff enough as to remain true to shape, particularly in the center of the filter element 25, where the filtering capacity allows only for very small deformations.

Figure 6:
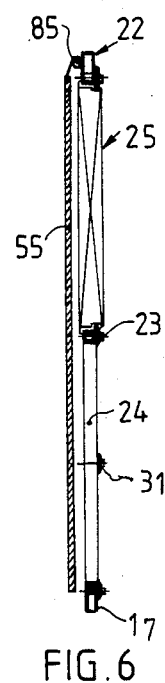
FIG. 6 and 7 are sections through this filter assembly, along lines VI—VI and VII—VII of FIG. 5.

As can be seen especially from FIGS. 6 and 8, during the normal spraying operation a shield 55 is provided on the booth side, in front of the filter assembly 35. This shield 55 has at least two marginal straps with lamellar sheeting 57 in between. Their lower ends 58 located towards the coating zone 18 transfer tangentially to the vertical plane of the boundary 59 of the shield, while its upper end 60 creates an angle of approx. 40° with respect to the vertical. However, in order to adjust these angles to the respective conditions of operation, the upper ends 6 are either elastically deformable or are swingably arranged around an articulation 61.

During the spraying operation, the air from the coating zone (18) is aspirated in accordance with the flow directions (62) through the shielding (55) and then, redirected almost vertically onto the filter strip 30. Thereby, the flow within the coating zone is directed slightly upward, so that any excess powder not adhering to the workpiece is carried further, in order to improve the uniformity of the coating. But the preponderent fraction of the entrained powder particles can not follow the relatively sharp upward turn at the entrance of the shielding 55. Therefore, these particles hit primarily the lamellae 57 and from there fall to the floor 67 of the booth.

The powder particles which have passed through the shielding 55 reach the outer side 64 of the surface membrane 37. These particles can not penetrate the surface membrane 37, since the perforations there are too narrow. However, due to a certain surface roughness and partially also to the form-filling impact, they are retained in this surface and have to be periodically removed by a cleaning process. The cleaning air stream blown in from the right through the filter strip, follows, as shown in FIG. 8, a path indicated by arrow 65 basically, flowing vertically through the filter strip 30, but is deflected downward in the shielding 55 according to the flow path directions 66, so that the powder particles detached from the surface 64 are carried downwards to the bottom of the booth.

As shown in FIG. 10, for the periodic cleaning at intervals we provide a pulse-cleaning device 68 assigned to each frame compartment. To each frame compartment a shielding hood 69 is assigned and sealingly mounted to the framework 22 and the frame cross members 23. In principle, several shielding hoods 69 can be separated from a trough-like part—let's say by divider walls. However, the pulse-transmitting hood space 7 has to be kept as small as possible. This space is defined by a lateral wall 71 inclined at an angle approximately below 30° with respect to the filter plane and by a top wall 72 inclined at an angle of approximately below 60° with respect to the filter plane. Suitably, this top wall is kept as small as possible and connected to the edge of the respective frame compartment 24 via inclined walls.

Over the opening of the top wall 72, a venturi tube 73 is mounted, which is directed vertically with respect to the top wall, in the hood space 70. Centrally with respect to the axis of the venturi tube 73, outside in the clean gas zone 47, a high-pressure blast nozzle 74 is mounted. It is connected to a compressed-air tank 77 by the solenoid valve 75. The individual solenoid valves 75 are in addition actuated cyclically, through a common control, so that at constantly equal time intervals, each one of the valves 75 is opened at a predetermined time interval and forces compressed air into the respective venturi tube 73. This compressed air pulse carries along secondary air from the clean gas zone 47 and produces thereby a sudden pressure increase in the hood space 70, whose effect is fully directed towards the only elastically deformable walling in the area, namely the filter element 25. As a result of the represented assymmetric configuration of the shielding hood 69 a maximum pressure load is reached over the entire surface of the filter element 25.

This sudden pressure increase has as a result, besides the higher or lower deformation of the filter elements, the fact that also through the smallest air channels of the filter strip, a great number of narrow flow paths are traversed by and swept through by air pulses. As a result, the powder which adhering to the surface 64 facing the shielding element 55 is detached and, either in front of or behind the shielding element 55, is deflected downward and transported to the bottom 67 of the booth, where it falls through an opening 78 and a screening installation 79 into the powder zone 80 of the powder container 7. After loosening by means of a fluidizing installation 81, provided at the bottom of the powder container, the loosened and sifted powder can be directed immediately from there to the spray guns 42, 44 via a conveying installation 83. The powder container 7 is slidable on rollers and can be exchanged or color changes.

Over the filter assembly 35 and the thereto pertaining filter recess 21 to the rear wall 41 a horizontal cylindrical track or rail 85 is mounted, on which normally the shielding element 55 is suspended. In order to facilitate a basic cleaning, such as becomes necessary after a prolonged heavy impact on the filter material, on this rail, as shown in FIG. 10, a traveling carriage 86 is suspended via rollers engaging the rail on top and at the bottom, having a hanging support arm shell 87. This shell has a U - or C-shaped cross section and is oriented towards the filter assembly with its slightly sealed open side. At the lower end of this approximately U-shaped support arm shell an exhaust connection 88 is mounted, which is connectable to, for instance, a common vacuum cleaner, in order to keep the pressure in the space between the support arm shell 87 and the filter assembly 35 below atmospheric pressure. As a result, within the support arm shell 87 the falling powder can be evacuated.

Further, on the traveling carriage 86, particularly on the support arm shell 87 a vertical rod guide 89 and a compressed-air cylinder 90 are mounted, serving to move back and forth, on a vertical path according to double arrow 94 a sliding nozzle carrier 91 with a high-pressure blast nozzle 92. This high-pressure blast nozzle is connected to the compressed-air circuit of the plant and is additionally moved back and forth in horizontal direction, continuously or in steps. This way, it follows a meandering rectangular path or a zig-zag path. Usually, the compressed-air nozzle 92 is directed vertically towards the filter strip, but can also have a lateral effect. However, it can also suit the purpose to have it blow downward, in a slightly inclined direction, namely in the direction of the hollow space in the support arm shell 87, whereby the compounded action with the flow at the exhaust connection 88 according to arrow 84 is improved.

This basic cleaning procedure can also be carried out, in principle, from the coating zone 18. The cleansing effect is even further improved, when this continuous basic cleaning is combined with the pulse-cleaning from the clean-gas zone 47, since in this case the processes of periodic pulse-expulsion and loosening overlap with the sweeping via the blast nozzle 92. For this purpose, pulse-duration and intervals can be determined to be respectively different from the normal operation values. These factors can also be varied periodically, by self-action, which can be accomplished without further ado through an electronic control. This, as well as comparable pneumatic controls, can be located in the clean-gas zone 47, which is accessible from the outside due to the swinging door 53.

Figure 12:
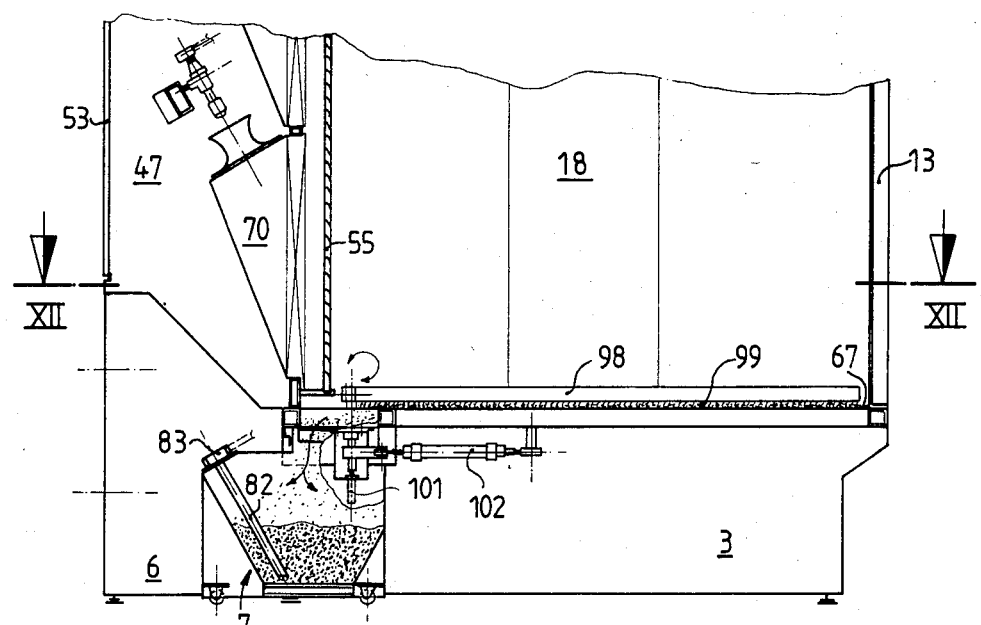
FIG. 12 is a partial section showing the deive of a bottom-cleaning device.
Figure 13:
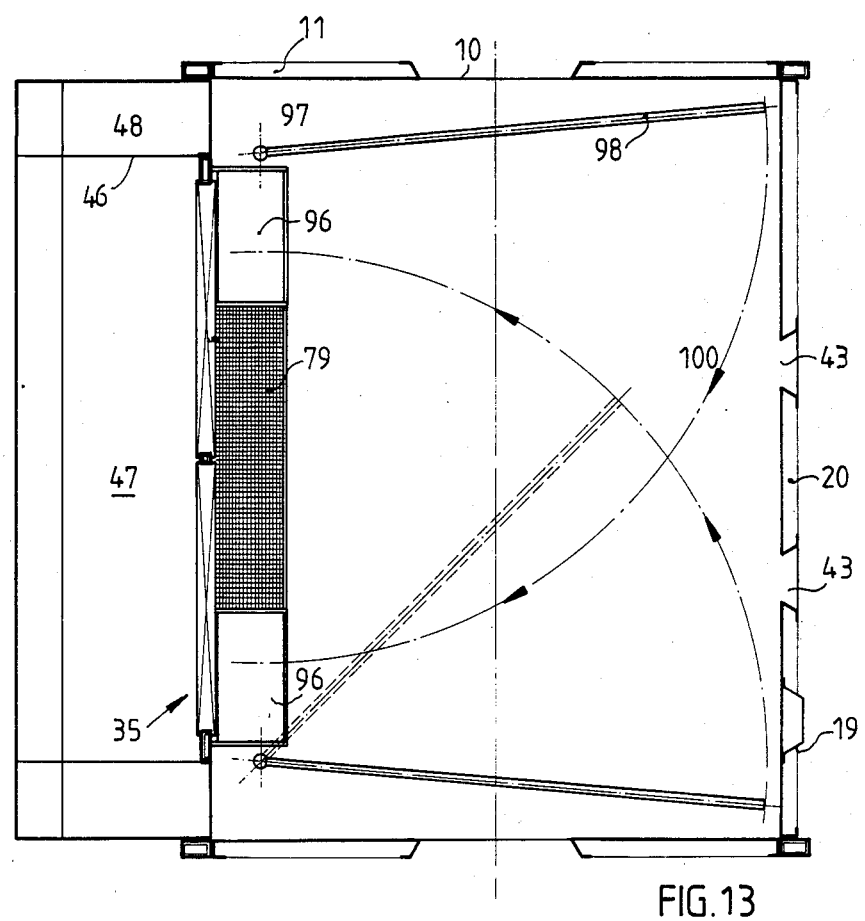
FIG. 13 an enlarged sectional representation along line XII—XII in FIG. 12.

As can be seen from FIG. 12, in the powder container 7 a vibrating screen 79 is mounted and covered by a grating 95, to which two air-premeable plates 96 made of porous sintered material or the like are laterally connected, making possible a fluidizing of the powder falling down from the marginal areas of the filter assembly 35. To one side of each of the two plates 96 a rocker shaft 97 being upward, through the floor of the booth, whose rocker arm 98 carries an exchangeable strut brush 99 on its lower side.

A lifting cylinder 97 and a rotating cylinder 102 act upon each rocker shaft 97; and they are actuated alternately in such a manner that the individual rocker arms 98 with their strut brushes 99 are swung inward during their descending sequence in accordance with arrow 100 then lifted and swung outward in their aeration sequence. The driving of the cylinders of the two rocker shafts 97 is mutually coordinated, so that the two rocker arms 98 do not hinder each other.

This way, the entire quantity of powder collected on the booth bottom 67 is brought into the powder container 7 through the bottom opening 78. The actuation of the rocker arms 98 can take place, in principle, alternately during the entire spraying operation. As a result, the floor surface can be kept clear all the time, as a rule.

Instead of mechanically, the sweeping can also be done penumatically. The rocker arm, which normally is built as a hollow body, can be connected to a compressed-gas source and then can be provided at its lower side or also laterally from the brush strips with air-permeable walling, of the kind made of sintered material such as in the case of the plates 96.

We claim:
1. A coating booth for applying a coating powder to an article introduced into said booth, said coating booth comprising:
   wall means defining an elongated chamber receiving said article and including a floor of said chamber, and a front wall and a rear wall lying opposite one another across said chamber and extending substantially the full length of said chamber from one end to an opposite end thereof;
   a rigid framework mounted in said rear wall and provided with crosspieces defining a plurality of rectangular openings in said framework;

respective replaceable filter units exchangeably positioned in said openings and each comprising a filter surface enclosed in a rigid frame supporting the respective filter surface, said framework being provided with means for replaceably mounting each frame on said framework, said wall means defining a clean gas zone on a side of said framework and filter units opposite the side thereof facing said chamber, said means for replaceably mounting each frame on said framework including a tensioning latch device on one of said sides of said framework engaging in an indentation in the respective frame, each frame on the opposite side thereof being formed with a lip overhanging said framework and provided with a resilient gasket yieldably bearing on said framework;

means communicating with said clean gas zone for drawing air with sprayed powder entrained therewith from said chamber through said filter surfaces from the side thereof facing said chamber, whereby air-entrained powder accumulates on said filter surfaces on the side thereof facing said chamber;

cleaning means for dislodging powder accumulated on said filter surfaces and for propelling the dislodged powder to the floor of said chamber, said cleaning means including at least one air nozzle and air guide means for air emerging from said nozzle in said clean gas zone for directing air through said filter surfaces from said side thereof opposite the side facing said chamber;

a powder container below said floor and communicating with said chamber through an opening formed in said floor adjacent said rear wall; and means for sweeping powder from said floor into said container through said opening.

2. The coating booth defined in claim 1 wherein each of said latch devices includes a swivelable member lying generally in a plane parallel to said framework and rotatable about an axis perpendicular to said plane.

3. The coating booth defined in claim 1 wherein each of said frames is formed with frame limbs of a U-shaped cross section opening inwardly and provided with a sealing mass in which an edge of the respective filter surface is sealingly received, said filter surface being folded in a zigzag pattern inwardly of said sealing mass.

4. A coating booth for applying a coating powder to an article introduced into said booth, said coating booth comprising:

wall means defining an elongated chamber receiving said article and including a floor of said chamber, and a front wall and a rear wall lying opposite one another across said chamber and extending substantially the full length of said chamber from one end to an opposite end thereof;

a rigid framework mounted in said rear wall and provided with crosspieces defining a plurality of rectangular openings in said framework;

respective replaceable filter units exchangeably positioned in said openings and each comprising a filter surface enclosed in a rigid frame supporting the respective filter surface, said framework being provided with means for replaceably mounting each frame on said framework, said wall means defining a clean gas zone on a side of said framework and filter units opposite the side thereof facing said chamber, each of said filter surfaces including an air-permeable support layer and a surface membrane of flexible and elastically deformable material attached to at least one side of said support layer, said membrane having a plurality of elongated perforations formed therein;

means communicating with said clean gas zone for drawing air with sprayed powder entrained therewith from said chamber through said filter surfaces from the side thereof facing said chamber, whereby air-entrained powder accumulates on said filter surfaces on the side thereof facing said chamber;

cleaning means for dislodging powder accumulated on said filter surfaces and for propelling the dislodged powder to the floor of said chamber, said cleaning means including at least one air nozzle and air guide means for air emerging from said nozzle in said clean gas zone for directing air through said filter surfaces from said side thereof opposite the side facing said chamber;

a powder container below said floor and communicating with said chamber through an opening formed in said floor adjacent said rear wall; and means in said chamber for sweeping powder from said floor into said container through said opening.

5. The coating booth defined in claim 4 wherein said membrane is at least unidimensionally stretched to form thin elongated fibers between slit-like perforations.

6. A coating booth for applying a coating powder to an article introduced into said booth, said coating booth comprising:

wall means defining an elongated chamber receiving said article and including a floor of said chamber, and a front wall and a rear wall lying opposite one another across said chamber and extending substantially the full length of said chamber from one end to an opposite end therefor;

a rigid framework mounted in said rear wall and provided with crosspieces defining a plurality of rectangular openings in said framework;

respective replaceable filter units exchangeably positioned in said openings and each comprising a filter surface enclosed in a rigid frame supporting the respective filter surface, said framework being provided with means for replaceably mounting each frame on said framework, said wall means defining a clean gas zone on a side of said framework and filter units opposite the side thereof facing said chamber;

means communicating with said clean gas zone for drawing air with sprayed powder entrained therewith from said chamber through said filter surfaces from the side thereof facing said chamber, whereby air-entrained powder accumulates on said filter surfaces on the side thereof facing said chamber;

cleaning means including a pair of arms swingable across said floor for dislodging powder accumulated on said filter surfaces and for propelling the dislodged powder to the floor of said chamber, said cleaning means including at least one air nozzle and air guide means for air emerging from said nozzle in said clean gas zone for directing air through said filter surfaces from said side thereof opposite the side facing said chamber;

a powder container below said floor and communicating with said chamber through an opening formed in said floor adjacent said rear wall between the arms; and means in said chamber for sweeping powder from said floor into said container through said opening; and means for causing said arms to approach said floor when said arms swing inwardly but lifting said arms away from said floor when said arms swing outwardly.

7. The coating booth defined in claim 6 wherein each of said arms is provided with means for replaceably receiving a strut brush.

8. The coating booth defined in claim 6 wherein each of said arms is provided with a porous wall supplied with compressed air for sweeping powder accumulated on said floor.

* * * * *